Oct. 12, 1954
F. E. ZEIGER
2,691,295
TORQUE TESTER
Filed Aug. 21, 1952
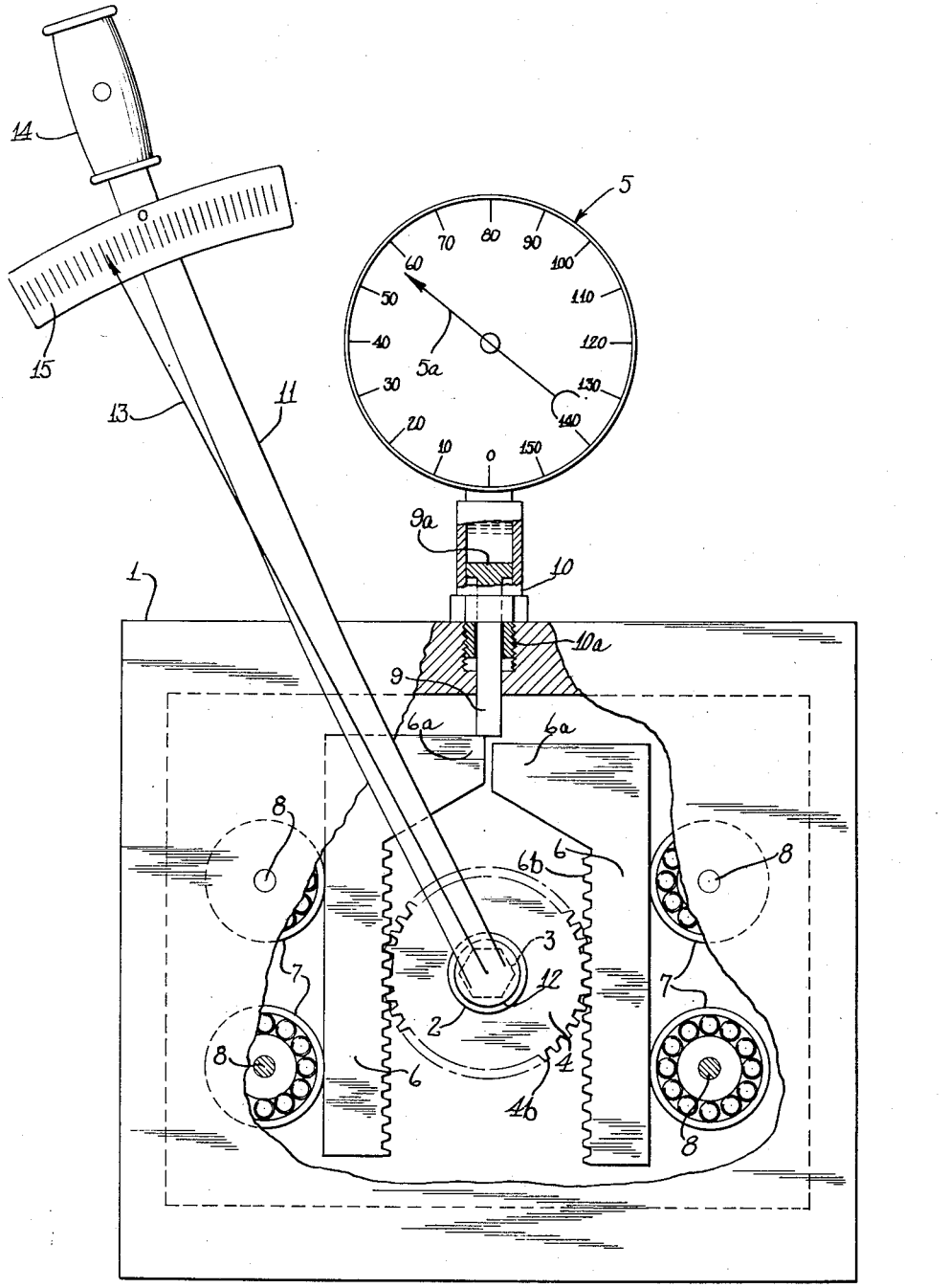
Inventor
Frank E. Zeiger Patented Oct. 12, 1954

2,691,295

UNITED STATES PATENT OFFICE 2,691,295

TORQUE TESTER

Frank E. Zeiger, Euclid, Ohio, assignor to Thompson Products, Inc., Cleveland, Ohio, a corporation of Ohio Application August 21, 1952, Serial No. 305,583

5 Claims. (Cl. 73—1)

The present invention relates to testing equipment for the maintenance of automotive tools.

More particularly, the invention contemplates the provision of a very simple testing apparatus which may be utilized to check torque wrenches utilized in automotive and other manufacturing assembly operations.

Modern mass production techniques which, utilize a system in which different individuals perform bolt tightening operations on the same assembly unit and in which the individuals are often not highly skilled, require the use of torque wrenches. These wrenches are basically similar to a usual socket or other standard type wrench with the exception that they include a measuring instrument or indicia which will tell the operator exactly how much force is being applied in tightening the bolt or nut to which the wrench is being applied. It may be readily seen that such an instrument will, if properly used, practically eliminate the differences between individuals with respect to the sense of feel, and the judgment as to the force actually being applied, and thereby produce an assembled article of uniform bolt tightness.

While such torque wrenches have proved invaluable in commercial assembly techniques, it is imperative that some method be utilized for constantly checking these wrenches against a standard in order to insure the very uniformity which is their sole function. Accuracy must be constantly checked since the wrenches change their response characteristics somewhat with continued use. It should be noted here that the uniformity is particularly critical with regard to the relative calibration among the various wrenches in operation and only secondarily important with regard to some external standard. This is true since it is generally recognized that it is important that all of the bolts holding a cylinder head, for example, should be tightened to the same degree. It is more important that the tension applied to all of bolts be equal than that the pressure on any individual bolt equal some exact standard value. The uniformity is necessary in order to prevent warping and distortion of the various parts during changes of temperature occasioned by operation of the device after manufacture.

It has been found that no satisfactory testing apparatus has been constructed in the prior art. It is, therefore, an object of the present invention to provide a novel apparatus for testing torque wrenches.

A further object of the present invention is the provision of a testing mechanism which will accurately indicate the accuracy of torque wrenches.

Yet another feature of the present invention is the provision of a testing apparatus having a low internal friction which is therefore highly efficient.

A further feature of the present invention is the provision of an extremely compact, portable testing apparatus for use with indicator wrenches.

A further object of the present invention is to provide a testing apparatus which utilizes fluid means and which, therefore, has a minimum of back lash or free play in the mechanism.

Still another feature of the present invention is the provision of a tester for production wrenches such as the so-called torque-wrench which is adapted to testing wrenches having varying bolt sizes and torque limits.

Still a further feature of the present invention is the provision of a torque wrench tester which requires the use of no external loose weights, clamps, or ungainly paraphernalia.

Another object of the present invention is to provide an instrument for the calibrating and testing of torque wrenches which is capable of testing right or left hand wrenches with equal facility.

Other objects and features of this invention will more fully appear in the following detailed description taken in connection with the accompanying drawings which illustrate a preferred embodiment thereof.

On the drawings the figure illustrates in partial cross-section a preferred embodiment of my novel torque wrench testing apparatus. As shown in this figure, the apparatus is in use and a torque wrench is positioned thereon.

As shown on the drawings:

As shown in the drawing, a generally rectangular housing 1 is provided for completely enclosing the moving parts of the mechanism in order that foreign matter will not interfere with the accurate movement of the various parts. A rotatable shaft 2 having a hexagonal end 3 is mounted for rotation in the housing 1. The shaft 2 has fixedly secured thereto a gear 4.

The gear 4 is adapted to transmit a force to the indicator 5 through a combined mechanical hydraulic system. In this construction, a rack 6 is provided having teeth 6b which mesh with the teeth 4b of the gear 4. The rack 6 has a toe portion 6a positioned for engagement with a reciprocable shaft member 9 which has a piston 9a fixedly secured to its opposite end. The shaft 9 and the piston 9a are supported for reciprocation in the tubular housing member 10 which is secured in the housing 1 by means of a threaded portion 10a. In order to reduce friction losses to a minimum, the racks 6 are guided by antifriction roller bearings 7 mounted on fixed shafts 8 in the housing 1.

The indicator 5 is a standard hydraulic pressure responsive gauge of any well known type, for example, a Bourdon gauge, which indicates directly pounds per square inch. The piston 9a preferably has an area of one square inch, and, therefore, the force in pounds which is applied by the wrench 6 to the rod 9 is directly indicated by the arrow 5a of the indicator 5. The indicator 5 shown on the drawings has a scale which will indicate a force of 160 pounds per square inch, which is therefore a force of 160 pounds as applied at the lower end of the rod 9. The pitch radius of the gear 4 is also preferably one inch, thereby permitting the indicator 5 to give a direct reading in inch pounds, which is a common unit of measure or torque forces. The dial of the indicator 5 may, of course, be divided by twelve to indicate foot pounds which is likewise a common measuring standard.

As may readily be seen from the drawing, a torque wrench 11 is attached to the hexagonal stud 3 for testing purposes. In this attachment the torque wrench may actually fit the stud 3 or it may in certain instances be required that an adapted be used. Such an adapter can be of any standard type and would, in most cases, comprise a sleeve having a socket at one end which would coact with the stud 3 and a socket in the other end which would cooperate with a male stud of square or other configuration projecting from the hub 12 of the wrench 11.

The wrench 11 is provided with an indicating arrangement which may be of various sorts. In the drawings shown here, the type of wrench which has a pointer 13 secured to the hub 12 of the wrench 11 is utilized. When the handle 14 is moved in a clockwise direction, for example, as shown in the figure, the resistance offered against the rotation of the stud 3 will cause the wrench shaft 11 to bend. This flexing of the shaft 11 causes the pointer 13 which is under no such tension to remain fixed relative to the stud 3, thus allowing a movement of the indicator card 15 which is secured to the shaft 11 past the pointer 13.

The indicator card 15 is, of course, calibrated with respect to the coefficient of elasticity of the shaft 11 so that a reading of either inch pounds or foot pounds may be directly taken from the wrench when in operation. As was stated in the objects of the present specification, one of the difficulties with torque wrenches is that, being dependent upon a coefficient of elasticity, they have a tendency to age with use with a resulting change in their deflection characteristics when applied to various loads. The result of this change is to render the wrench inaccurate. Through the use of the present testing device all of the torque wrenches of a plant can easily be calibrated to the same values periodically. Such calibration requires only that each of the wrenches be tested and its dial plate be moved to its proper position or a modified dial be substituted.

The construction herein disclosed contemplates an arrangement whereby both right and left handed torque wrenches may be calibrated. In accomplishing this, a pair of symmetrical racks 6 are utilized rather than merely one. It is apparent from a consideration of the drawing that rotation of the wrench 11 in either counterclockwise or clockwise direction will cause one of the racks 6 to be reciprocated upwardly. This reciprocation in upward direction will cause the gauge 5 to register. Reversal of the direction of rotation will cause the other rack 6 to reciprocate upwardly, thus also causing the indicator 5 to register. This reversability is an important feature since the use of left handed fasteners is quite common in various fields.

It will be seen thus from the above description of the drawing that I have provided a novel, very compact, efficient and fool-proof testing apparatus for torque wrenches. This apparatus may be moved about easily and provides a constant reference for calibrating the torque wrenches to a standard, uniform value.

It will be understood that modifications and variations may be effected without departing from the scope of the novel concepts of the present invention.

I claim as my invention:

1. A torque wrench calibrating mechanism comprising a housing, a rotatable gear mounted in said housing, a pair of L-shaped racks mounted on opposite sides of said gear in a plane transverse to the axis of rotation of said gear, the edges of said racks facing said gear having teeth thereon for cooperation with the teeth on said gear, anti-friction rollers positioned on the opposite side of each of said racks from said gear for maintaining said racks in position against said gear and for reducing frictional losses incidental to the reciprocation of said racks by the tangential application of force to said racks by said gear teeth, the short legs of said L-shaped racks extending toward each other, and gauge means positioned in straddling relationship to both of said short legs for movement in one direction by one or the other of said racks depending on which direction the gear is rotated under the influence of a torque wrench to be calibrated.

2. A torque wrench calibrating apparatus comprising a housing, a gear rotatable within said housing, a pair of racks mounted on opposite sides of said gear for reciprocation by said gear, hydraulic cylinder means secured to said housing, a single piston slidably mounted within said cylinder and positioned in the line of travel of both of said racks for contact with and actuation in one direction by one or the other of said racks, gauge means hydraulically connected with said piston for indicating force applied to said piston by said one or other rack, and means for attaching a torque wrench to said gear for rotation of said gear in either direction to actuate said racks whereby said apparatus will indicate the torsional forces applied by said wrench upon rotation of the torque wrench in either clockwise or counterclockwise direction.

3. A torque wrench calibrating mechanism comprising a housing, a rotatable gear within said housing, a pair of L-shaped racks mounted on opposite sides of said gear for reciprocation by rotation of said gear, a single gauge means having sensing means mounted in the paths of movement of said racks, and means on said gear for attachment of a torque wrench having an indicator thereon, whereby rotation of said torque wrench will reciprocate said racks in opposite directions so that one of said racks will actuate said gauge through said sensing means whereby the indicator of said torque wrench may be calibrated with said gauge.

4. A torque wrench calibrating mechanism comprising a housing, a rotatable gear mounted in said housing, a pair of L-shaped racks mounted on opposite sides of said gear with the short legs of the L's extending toward each other, a single piston means straddling the short legs for operation in a single direction by one or the other of said legs, hydraulic cylinder means receiving said piston for actuation in response to forces applied to said piston by said racks, gauge means for indicating the pressure exerted on the piston, and means on said gear for attachment to a torque wrench whereby rotation of said wrench will apply force through one of said racks to said piston to thereby actuate said gauge and permit calibration of said wrench with respect to said gauge.

5. A torque wrench calibrating mechanism comprising a housing, an oscillatable gear mounted in said housing, a pair of racks mounted on opposite sides of said gear for reciprocation by said gear, a single movable member positioned in the path of movement of a portion of each of said racks for actuation by one or the other of said racks, gauge means operatively connected to said movable member for indicating the force exerted on said member, and means on said gear for attachment to a torque wrench whereby rotation of said wrench will apply a force through one of said racks to said movable member and said gauge to thereby permit calibration of said wrench with respect to said gauge.

References Cited in the file of this patent

UNITED STATES PATENTS

| Number | Name | Date |
| --- | --- | --- |
| Re. 21,242 | Bitzer et al. | Oct. 24, 1939 |
| 817,907 | Feist | Apr. 17, 1906 |
| 2,190,967 | Zimmerman | Feb. 20, 1940 |
| 2,443,049 | McVey | June 8, 1948 |